United States Patent [19]

Reus et al.

[11] 4,419,333

[45] Dec. 6, 1983

[54] PROCESS FOR REMOVAL OF NITROGEN OXIDES

[75] Inventors: Josef Reus, Maintal; Hans Wewer, Schoneck; Hofmann Jürgen, Bad Orb., all of Fed. Rep. of Germany

[73] Assignee: Nukem GmbH, Hanan, Fed. Rep. of Germany

[21] Appl. No.: 398,929

[22] Filed: Jul. 16, 1982

Related U.S. Application Data

[63] Continuation of Ser. No. 237,950, Feb. 25, 1981, abandoned.

[30] Foreign Application Priority Data

Mar. 1, 1980 [DE] Fed. Rep. of Germany ....... 3008012

[51] Int. Cl.$^3$ ............................................. C01B 21/00
[52] U.S. Cl. .................................... 423/235; 423/393; 423/394
[58] Field of Search ................... 423/235, 235 D, 239, 423/239 A, 393, 394; 55/68, 220

[56] References Cited

U.S. PATENT DOCUMENTS

| | | | |
|---|---|---|---|
| 1,708,685 | 4/1929 | Taylor | 423/393 |
| 2,028,402 | 1/1936 | Luuscher | 423/393 |
| 4,062,928 | 12/1977 | Applegate et al. | 423/392 |
| 4,309,396 | 1/1982 | Heibrechtsmeier et al. | 423/393 |

FOREIGN PATENT DOCUMENTS

| | | |
|---|---|---|
| 2818433 | 8/1979 | Fed. Rep. of Germany . |
| 52-38460 | 3/1977 | Japan ................................. 423/235 |

OTHER PUBLICATIONS

Chemical Abstract, vol. 68, 1968, 4498v.

*Primary Examiner*—Gregory A. Heller

[57] ABSTRACT

To remove nitrous gases from gas mixtures there is needed a process and apparatus by which they can be eliminated quickly, without formation of secondary waste and as cheaply as possible. This is done by scrubbing the nitrous gases out of the gaseous mixture with 15–50% nitric acid solution and treating this solution additionally with gaseous oxygen, especially atmospheric oxygen.

7 Claims, 1 Drawing Figure

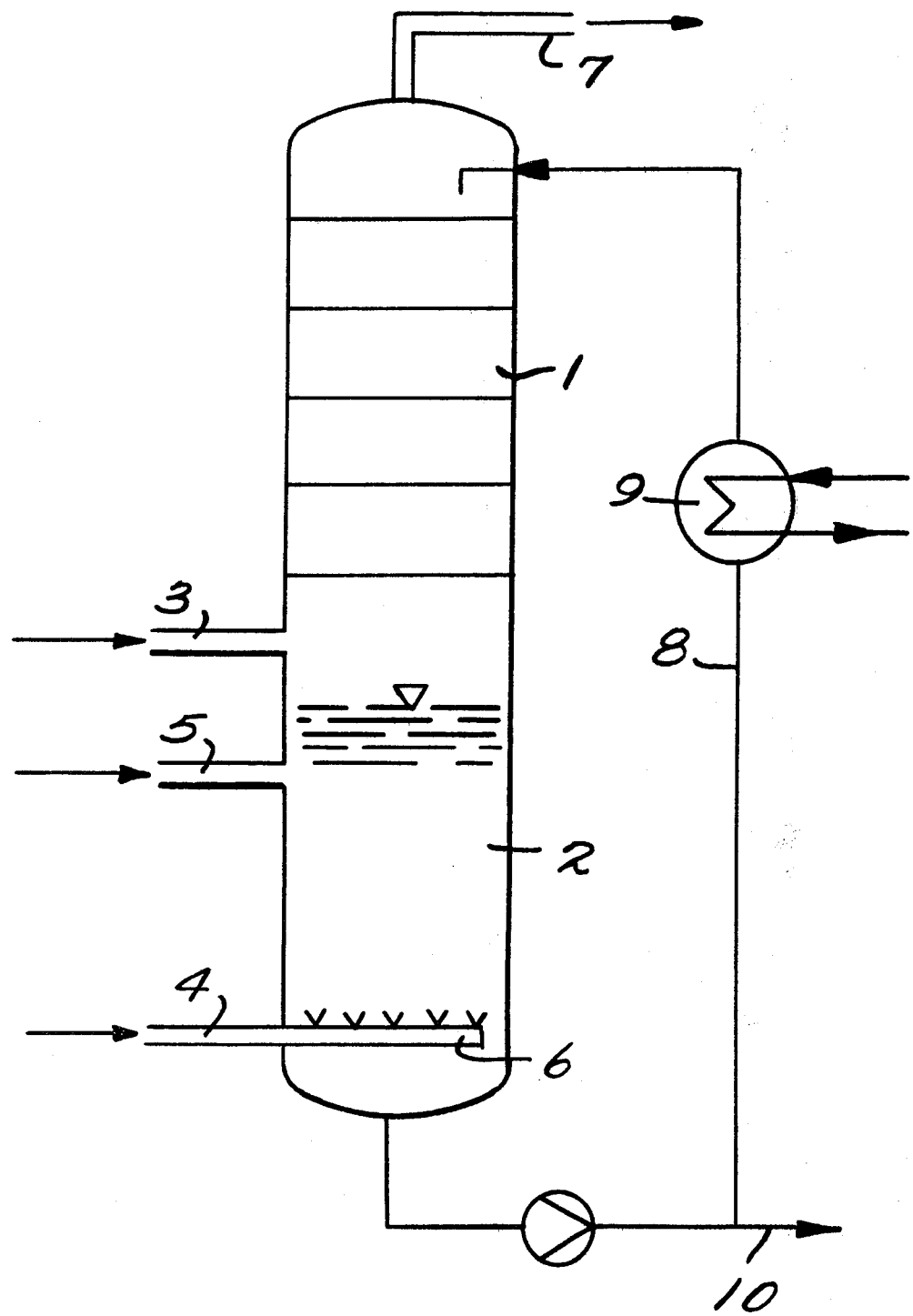

PROCESS FOR REMOVAL OF NITROGEN OXIDES

This is a continuation of application Ser. No. 237,950 filed Feb. 25, 1981 and now abandoned.

BACKGROUND OF THE INVENTION

The invention is directed to a process and apparatus for the removal of nitrous gases from gaseous mixtures by the addition of oxidation agents and absorption of the nitric oxide in aqueous solutions. This process particularly serves for preliminary purification of gaseous mixtures which contain large amounts of nitrous gases in order to save expense in the later fine purification.

The absorption of nitrous gases is one of the most difficult problems to solve in the waste air purification art. One of the chief resistances hereby is in the poor solubility of nitrogen monoxide (NO) in aqueous systems. Among others, if the nitrous gases are present preponderantly as nitrogen dioxide ($NO_2$), through disproportionation of the $NO_2$ there is formed NO in the aqueous solution, which NO because of its poor solubility goes into the gas phase. This nitrogen monoxide then is only removed from the gas stream with great expense.

In the alkaline absorption of nitrogen oxides, theoretically there are formed nitrite and nitrate if at least equal parts by volume of $NO_2$ and NO are present or the $NO_2$ is in excess.

However, it has been shown in practice that in spite of excess liquor because of nonideal transportation of material in the liquid phase and the local over-acidification conditioned thereby that the reaction $3NO_3 + H_2O \rightarrow 2HNO_3 + NO$ occurs and NO is ascertained in the outlet of the absorber.

Besides large amounts of toxic materials are produced in the form of nirite and nitrate which are suited only in limited fashion for working up to fertilizer material.

It is known to remove nitrous gases from gas mixtures with reductive processes. For reducing absorption there are various processes. All they have in common is that there is employed a reducing material such as, e.g. sulfide or thiosulfate for the reduction of the $NO_2$, whereby in the ideal case nitrogen is formed, but mostly dinitrogen monoxide ($N_2O$).

These reductive processes only function optimally if the nitrous gases are present exclusively as $NO_2$. With an increasing portion of NO they are ineffective. Besides through the addition of the necessary reducing agent there arise high costs for chemicals. In most cases (e.g. with sulfur containing reducing agents) these reducing agents produce fresh toxic materials in the form of the oxidation product.

There are also known processes for the removal of nitrous gases from gaseous mixtures by oxidation of the nitric oxide. These are looked upon as ideal processes in which there is produced a further usable nitric acid from the nitric oxides without the formation of secondary toxic materials. Certainly there is needed a larger apparatus expense for the oxidation of the NO or the NO formed through the disproportionation of the NO formed in the gas phase.

The oxidation of concentrated nitrogen monoxide (NO) takes place spontaneously and exothermically with atmospheric oxygen to nitric oxide ($NO_2$). Limited by the small probability of simultaneous successive meeting of one $O_2$ and 2NO molecules in this gas phase, oxidation in this gas phase, oxidation with decreasing nitric oxide concentration, of course, there is always required longer residence times of the gaseous mixture in the reactor.

With the nitric oxide concentration occurring in the waste air sector this can lead to residence times of the order of magnitude of several minutes to hours. With the customary amounts of waste air it takes therethrough an oxidation space up to several hundred cubic meters.

In the case of the use of oxidation chemicals such as, e.g. hydrogen peroxide or ozone, there occur high costs for chemicals or high investment costs. To be sure here the requirement for producing no secondary toxic material is fulfilled in an ideal manner.

Another process which depends on the use of potassium permanganate ($KMnO_4$) as the oxidation agent only functions if the nitric oxide consists of up to 50% $NO_2$. The $KMnO_4$ here merely has a catalytic function. Theoretically the potassium permanganate is not consumed in this process but unavoidable losses of this expensive material in practice cause high costs. Besides thereby nitrite is produced which first must be worked up on else it causes waste water problems.

Furthermore, there are various processes for the gas reduction of nitrous gases, e.g. with hydrogen or even with ammonia, to nitrogen. Apart from the high consumption of hydrogen or ammonium these processes require temperatures above 250° C. and the employment of catalysts. Disadvantageous hereby above all is the high energy expense and the sensitivity of the catalysts to impurities of the crude gas, as they are unavoidable, e.g. in the stainless steel pickling plants.

Therefore, it was the problem of the present invention to find a process and an apparatus for the removal of nitrous gases from gas mixtures by addition of an oxidation agent and absorption of the nitric oxides in aqueous solutions with which the nitrous gases can be removed quickly from the gaseous mixtures without formation of secondary waste and without high expense.

SUMMARY OF THE INVENTION

This problem was solved according to the invention by scrubbing the nitrous gases out of the gaseous mixture with a 15–50% nitric acid solution and additionally treating the solution with gaseous oxygen.

According to the invention the nitric oxides, chiefly nitrogen monoxide, are dissolved in a nitric acid containing liquid phase and oxidized there to nitric acid by likewise dissolved atmospheric oxygen.

The solubility of nitrogen monoxide is dependent on the concentration of the nitric acid. For the process of the invention there has proven satisfactory a concentration range between 15 and 50 weight % $HNO_3$. Preferably there is used a solution which contains 25–40% nitric acid. The oxidation of the nitric oxides to nitric acid takes place in the process of the invention in the liquid phase and therefore progresses very quickly, without needing costly devices or expensive oxidation chemicals.

The oxygen, preferably atmospheric oxygen, is added to the nitric acid containing washing liquid for example, either by directly blowing it in or by sucking it in by means of a vacuum.

It has been found satisfactory in the process of the invention to carry out the absorption and the oxidation of the nitrous gases at a temperature of 10°–50° C., preferably 20°-30° C. Therefore in many cases a cooling is necessary.

Since oxygen is not dissolved in nitric acid as well as the nitrous gases, it is advantageous to attain an adequate introduction of oxygen into the wash liquid in such manner that there is produced the longest possible residence time of the washing liquid laden with the oxygen. Therefore, it is advantageous for the carrying out of the process of the invention to use an apparatus which consists of a column portion and a sump portion whereby the inlet line for the nitrous gases containing gas mixture is arranged below the column portion and the inlet time for the oxygen leads into the sump. Preferably the sump volume or the liquid volume to the portion of the column plates not to be flowed through by the gaseous mixture to be purified, depending on the ratio of the solubilities and the amounts of gases, is greater than the volume of liquid to the portion of the column plates flowed through by the crude gas, with packed columns in the packing ballast or in packed columns within the column packing. Preferably the purified gas mixture is additionally subjected to a known oxidation treatment with hydrogen peroxide, as is described for example in German OS No. 2818473. The German OS states:

Therefore, it was the problem of the present invention to find a process and an apparatus for removal of nitrous gas from the waste air and the waste gases by oxidation with hydrogen peroxide whereby not only the $NO_2$ but also the NO should be removed as quantitatively as possible.

The problem was solved according to the invention by washing the waste air and waste gases laden with nitrous gases with a nitric acid-hydrogen peroxide mixture present in the gas space in the form of fine droplets of the size 1 to 20μ and subsequently separating the droplets from the gas stream.

Preferably, the droplets have a particle size of less than 10μ. The composition of the nitric acid-hydrogen peroxide mixture can be varied between 0.5 to 5 molar in $HNO_3$ and 1 to 8 molar in $H_2O_2$. There has proven especially good a mixture of 1 molar $HNO_3$ and 10% $H_2O_2$ in the mixing ratio 1:2 to 2:1.

The extraordinarily large exchange surface between the $HNO_3/H_2O_2$ mixture dispersed on an aerosol and the nitrous gases effects on the surface and in the interior of the aerosol not only is a quick and complete reaction of $NO_2$ but also of NO to $HNO_3$. The $HNO_3/H_2O_2$ mixture with the newly formed $HNO_3$ is advantageously recycled. Through the use of an $HNO_3/H_2O_2$ mixture there is simultaneously guaranteed that no secondary NO forms.

In the process of the invention there is produced nitric acid which can be automatically withdrawn from the sump of the plant. Since it is a matter in the reaction of NO, water and nitric acid of an equilibrium reaction, there can be calculated the equilibrium loads of NO in the gas phase and $HNO_2$ in the nitric acid. Through this it is possible to ascertain the theoretical number of plates for the absorption of NO in the nitric acid solution. By the use of a plate column as the first absorption stage according to the process of the invention with additional introduction of oxygen in the liquid phase the use of oxidation chemicals in the second stage, which operates with hydrogen peroxide, is reduced to about 10%.

BRIEF DESCRIPTION OF THE DRAWING

The single FIGURE of the drawing shows in schematic form an advantageous form of an apparatus for carrying out the process of the invention.

Unless otherwise indicated all parts and percentages are by weight.

The process can comprise, consist essentially of or consist of the steps set forth with the stated materials.

DETAILED DESCRIPTION

The apparatus consist of a column portion 1 and a sump portion 2. Below the column portion 1, there is located a supply line 3 for the gaseous mixture and a water supply 5, while the supply line 4 for the oxygen leads into the sump 2.

The nitric oxide containing gas mixture enters the column portion 1 and flows through the column portion 1 in countercurrent to the adsorption solution from below upwardly. The purified gaseous mixture leaves the column head via the pure gas line 7. The absorption solution enriched with dissolved nitric oxides subsequently reaches the column sump 2. Here the oxygen, preferably atmospheric oxygen, is introduced into the absorption, i.e. into the liquid phase, through a device 6 suited for this purpose. The introduction of the oxygen into the liquid necessary for the oxidation can take place by furnishing a sufficiently large volume of liquid in the sump portion 2 at normal pressure or at reduced pressure in a residence container in the wash liquid circulating line 8.

The total heat set free in the process is drawn off by condenser 9. The nitric acid formed is removed from the apparatus via a line 10.

The entire disclosure of German priority application No. P3008012.7-43 is hereby incorporated by reference.

What is claimed is:

1. A process for the removal of nitrogen monoxide from a gas mixture by scrubbing the nitrogen monoxide containing gas mixture with a nitric acid solution in the column portion of an absorption apparatus consisting essentially of a column and a sump, said process comprising passing the nitric acid solution from the column portion to the sump and introducing gaseous oxygen as an oxidizing agent into the nitric acid present as a 15-50 weight % solution in said sump, there being a sufficiently large volume of said nitric acid solution containing said oxygen present in the sump that there is produced the oxidation of the nitrogen monoxide in the solution and wherein the thus purified gas mixture still contains residual nitrogen monoxide and nitrogen dioxide and oxidizing the residual nitrogen monoxide and nitrogen dioxide with hydrogen perioxide to convert the residual nitrogen monoxide and nitrogen dioxide to nitric acid.

2. A process according to claim 1 wherein the oxygen is atmospheric oxygen.

3. A process according to claim 1 wherein the scrubbing of the nitrogen monoxide is with 25-40 weight % nitric acid.

4. A process according to claim 3 wherein the absorption and the oxidation of nitrogen monoxide occurs at a temperature of 10°-50° C.

5. A process according to claim 4 wherein the temperature is 20°-30° C.

6. A process according to claim 1 wherein the absorption and the oxidation of nitrogen monoxide occurs at a temperature of 10°-50° C.

7. A process according to claim 1 wherein the temperature is 20°-30° C.

* * * * *